US012791502B2

(12) United States Patent
Lv et al.

(10) Patent No.: US 12,791,502 B2
(45) Date of Patent: Nov. 10, 2026

(54) TEMPERATURE TESTING SYSTEM AND METHOD FOR HYDRATE NUCLEATION AND PHASE TRANSITION BASED ON INFRARED IMAGING

(71) Applicant: Ningbo Institute of Dalian University of Technology, Ningbo (CN)

(72) Inventors: Xin Lv, Beijing (CN); Huiyong Liang, Pizhou (CN); Yanzhen Liu, Rizhao (CN); Shi Shen, Dalian (CN)

(73) Assignee: Ningbo Institute of Dalian University of Technology, Ningbo (CN)

( * ) Notice: Subject to any disclaimer, the term of this patent is extended or adjusted under 35 U.S.C. 154(b) by 263 days.

(21) Appl. No.: 18/743,127

(22) Filed: Jun. 14, 2024

(65) Prior Publication Data

US 2025/0123227 A1 Apr. 17, 2025

(30) Foreign Application Priority Data

Oct. 17, 2023 (CN) ......................... 202311338880.9

(51) Int. Cl.
*G01N 25/14* (2006.01)

(52) U.S. Cl.
CPC ......... *G01N 25/147* (2013.01); *G01N 25/145* (2013.01)

(58) Field of Classification Search
CPC ........................... G01N 25/147; G01N 25/145
(Continued)

(56) References Cited

U.S. PATENT DOCUMENTS 4,925,646 A * 5/1990 Tom ......................... C01G 1/06 423/210
5,140,824 A * 8/1992 Hunt ...................... C09K 5/044 252/68

(Continued)

FOREIGN PATENT DOCUMENTS

CN 102703152 A * 10/2012

OTHER PUBLICATIONS

English Machine Translation of CN102703152A to Peng et al. (Year: 2012).*

*Primary Examiner* — Laura Martin Sweeney
*Assistant Examiner* — Philip L Cotey

(57) ABSTRACT

A temperature testing system for hydrate nucleation and phase transition based on infrared imaging is provided and includes a gas-liquid supplying device, a refrigeration device, an infrared imaging device, a hydrate generation device, and a data acquisition device. The gas-liquid supplying device is configured to provide a gas and a liquid required for synthetizing a hydrate. The refrigeration device is configured to provide a temperature environment required for synthetizing the hydrate. The infrared imaging device is configured to in-situ measure temperature changes caused during a formation of the hydrate. The hydrate generation device is configured to provide a visual growth environment for nucleation and phase transition of the hydrate. The data acquisition device is configured to collect a temperature, a system pressure, and infrared imaging data from the hydrate generation device. The temperature testing system can accurately determine the temperature evolution during the nucleation, formation, and decomposition of the hydrate.

8 Claims, 2 Drawing Sheets

(58) Field of Classification Search
USPC ........................................................ 374/45
See application file for complete search history.

(56) References Cited

U.S. PATENT DOCUMENTS

| | | | | |
|---|---|---|---|---|
| 8,371,747 | B2 * | 2/2013 | Anderson | G01N 33/2805 374/45 |
| 8,602,640 | B2 * | 12/2013 | Chiarello | G01N 21/43 374/45 |
| 2002/0048610 | A1 * | 4/2002 | Cima | B01J 19/0046 435/7.1 |
| 2004/0005720 | A1 * | 1/2004 | Cremer | B01L 3/50851 435/7.1 |
| 2005/0233461 | A1 * | 10/2005 | Levinson | G01N 33/15 436/79 |
| 2007/0276169 | A1 * | 11/2007 | Tohidi | G01N 25/56 585/15 |
| 2013/0298661 | A1 * | 11/2013 | Chun | G01N 33/241 73/152.09 |
| 2016/0045841 | A1 * | 2/2016 | Kaplan | B01D 3/06 429/49 |
| 2018/0003619 | A1 * | 1/2018 | Sieben | G01N 33/2835 |
| 2019/0101336 | A1 * | 4/2019 | Victor | F28D 15/06 |
| 2020/0002828 | A1 * | 1/2020 | Mills | C25B 13/04 |
| 2020/0363119 | A1 * | 11/2020 | Shinozaki | F25D 29/008 |
| 2021/0041379 | A1 * | 2/2021 | Yang | B01L 3/502715 |
| 2023/0303920 | A1 * | 9/2023 | Sultan | C07C 29/76 |
| 2025/0066656 | A1 * | 2/2025 | Turnaoglu | F28D 20/02 |

* cited by examiner

TEMPERATURE TESTING SYSTEM AND METHOD FOR HYDRATE NUCLEATION AND PHASE TRANSITION BASED ON INFRARED IMAGING

CROSS-REFERENCE TO RELATED APPLICATION

This application claims priority to Chinese patent application No. CN 202311338880.9, filed to China National Intellectual Property Administration (CNIPA) on Oct. 17, 2023, which is herein incorporated by reference in its entirety.

TECHNICAL FIELD

The disclosure relates to the technical field of hydrate nucleation and phase transition, and particularly to a temperature testing system and method for hydrate nucleation and phase transition based on infrared imaging.

BACKGROUND

Hydrates are cage-like non-stoichiometric crystalline substances formed by gas molecules and water molecules at lower temperatures and higher pressures. During the formation and decomposition of the hydrates, correspondingly, hydrogen bonds are generated and broken, which results in the release and absorption of heat. The temperature changes caused by the formation and the decomposition of the hydrates are key issues in the fields of flow safety assurance and the development and utilization of hydrate resources.

Currently, the research on the formation and the decomposition of gas hydrates mainly focuses on the following three aspects. Firstly, in the field of the flow safety, the evaluation of hydrate inhibitors is detected by measuring an exothermic process of the hydrate formation and the decomposition to evaluate the inhibitory effect on the hydrates. Secondly, in the storage and transportation of methane hydrates, the formation and decomposition processes of the hydrates are measured. The formation process is used to determine the methane storage capacity, and the exothermic process is used to evaluate the rate of methane release. Thirdly, in the field of hydrate cold storage, the endothermic process of the hydrate decomposition is used to select guest molecules.

In addition, the characteristics of temperature distribution during the nucleation, formation, and decomposition of hydrates also play an important role in the study of mass transfer of the guest molecules and the characteristics of hydrate defects. Therefore, quantitative determinations of the characteristics of the temperature distribution during the formation and the decomposition of the gas hydrates have a positive impact on the development of hydrate technical applications, storage, transportation, and resource exploitation.

Currently, there are mainly two methods for measuring temperature changes during the formation and the decomposition of the hydrates: one is through temperature sensors, which includes placing a temperature sensor inside a low-temperature and high-pressure vessel to measure the temperature changes during the formation and the decomposition of the hydrates. Another one is through calorimetry, using instruments such as a differential scanning calorimeter to quantitatively measure the heat changes during the formation and the decomposition of the hydrate. However, both methods using the temperature sensors and the calorimetry measure overall temperature changes, and they cannot precisely quantify the temperature differences and the evolution process between nucleation points and the surrounding areas during the nucleation and the decomposition of the hydrate.

SUMMARY

In order to solve the above problems, a temperature testing system and a method for hydrate nucleation and phase transition based on infrared imaging are provided to quantitatively measure the heat transfer characteristics during the hydrate nucleation and phase transition in detail.

The technical solutions of the disclosure are as follows.

A temperature testing system for hydrate nucleation and phase transition based on infrared imaging includes a gas-liquid supplying device, a refrigeration device, an infrared imaging device, a hydrate generation device, and a data acquisition device. The gas-liquid supplying device is configured to provide a gas and a liquid required for synthetizing a hydrate. The refrigeration device is configured to provide a temperature environment to the hydrate generation device required for synthetizing the hydrate. The infrared imaging device is configured to in-situ measure temperature changes of the hydrate generation device caused during a formation of the hydrate. The hydrate generation device is configured to provide a visual growth environment for nucleation and phase transition of the hydrate. The data acquisition device is configured to collect a temperature, a system pressure, and infrared imaging data from the hydrate generation device.

In an embodiment, the gas-liquid supplying device includes a gas cylinder, a high-pressure pump, a water container, and a water injection pump, the gas cylinder and the high-pressure pump are configured to provide the gas with a high pressure for the hydrate generation device, and the water container and the water injection pump are configured to provide the liquid for the hydrate generation device.

In an embodiment, the refrigeration device is connected to the gas-liquid supplying device through a pressure resistant metal pipeline, and the refrigeration device includes a water bath device and a refrigeration platform. The refrigeration device is configured to control the temperature required for the formation of the hydrate through providing a cold fluid through the water bath device or providing the temperature environment for the hydrate generation device through the refrigeration platform in in a semiconductor refrigeration manner.

In an embodiment, the infrared imaging device includes an infrared imager and an infrared imaging mounting bracket, the infrared imager is configured to measure temperature changes of the hydrate generation device during the formation of the hydrate, and the infrared imaging mounting bracket is configured to fix the infrared imager.

In an embodiment, a material of the hydrate generation device is sapphire, the hydrate generation device includes a hydrate generation chamber and a waste liquid container, and the waste liquid container is configured to accommodate a waste liquid.

In an embodiment, the data acquisition device includes a temperature sensor, a pressure sensor, and a computer data acquisition system; the temperature sensor is configured to collect the temperature in the hydrate generation device, the pressure sensor is configured to collect a system pressure in the hydrate generation device, and the computer data acquisition system is configured to receive the infrared imaging data from the infrared imaging device and perform data analysis on the infrared imaging data.

A temperature testing method for hydrate nucleation and phase transition based on infrared imaging is further provided and includes steps as follows.

Step 1, preparing for experimental conditions includes:

step 1.1, adding a liquid into a hydrate generation chamber through a water injection pump;

step 1.2, opening a gas cylinder to inject a gas into the hydrate generation chamber through a high-pressure pump;

step 1.3, performing a refrigeration cycle and controlling a temperature inside the hydrate generation chamber through an external cooling;

Step 2, conducting infrared thermal imaging experiments to determine thermal effects of nucleation and phase transition of a hydrate:

step 2.1, according to the experimental conditions, setting a corresponding pressure through the high-pressure pump and setting a constant pressure inside the hydrate generation chamber through a constant pressure mode;

step 2.2, according to the experimental conditions, setting a cooling rate and a constant temperature of the refrigeration cycle of a water bath device;

step 2.3, while performing step 2.2, turning on an infrared imager to record temperature changes of the hydrate generation chamber during the formation of the hydrate;

step 2.4, recording surrounding temperature changes of the hydrate generation device caused by a heat release during a nucleation process of the hydrate, and then recording system temperature changes during a formation process of the hydrate;

step 2.5, after the formation process of the hydrate is completed, setting a temperature gradient and the constant temperature of the refrigeration cycle of the water bath device; and step 2.6, recording the temperature changes in a surrounding environment of the hydrate generation device caused by the decomposition and heat absorption process of the hydrate using the infrared imager.

The hydrate generation generates heat that causes temperature changes, and the system temperature changes is the temperature changes caused by the heat release during the hydrate generation in the hydrate generation chamber.

In an embodiment, in the step 1, the injected gas is a single gas or a mixed gas, and the added liquid is a salt solution or an organic solution.

The benefits of the disclosure are as follows.

The temperature testing system and method for hydrate nucleation and phase transition based on infrared imaging are provided to determine the temperature evolution during the nucleation, formation, and decomposition of the hydrate. During the experiment, temperature and pressure can be set according to the working conditions (i.e. experimental conditions), and the micro-environmental temperature changes caused by the hydrate nucleation and phase transitions can be recorded in real-time and in situ using infrared thermal imaging.

BRIEF DESCRIPTION OF DRAWINGS

The attached drawings generally illustrate various embodiments by way of example rather than limitation, and are used together with the specification and claims to illustrate the embodiments of the disclosure. When appropriate, use the same reference numerals in all drawings to refer to the same or similar parts. Such embodiments are illustrative and not intended as exhaustive or exclusive embodiments of the present device or method.

DETAILED DESCRIPTION OF EMBODIMENTS

It should be noted that, without conflict, the embodiments and features in the embodiments of the disclosure can be combined with each other. The following will refer to the attached drawings and combine them with embodiments to provide a detailed explanation of the disclosure.

Figure 1:
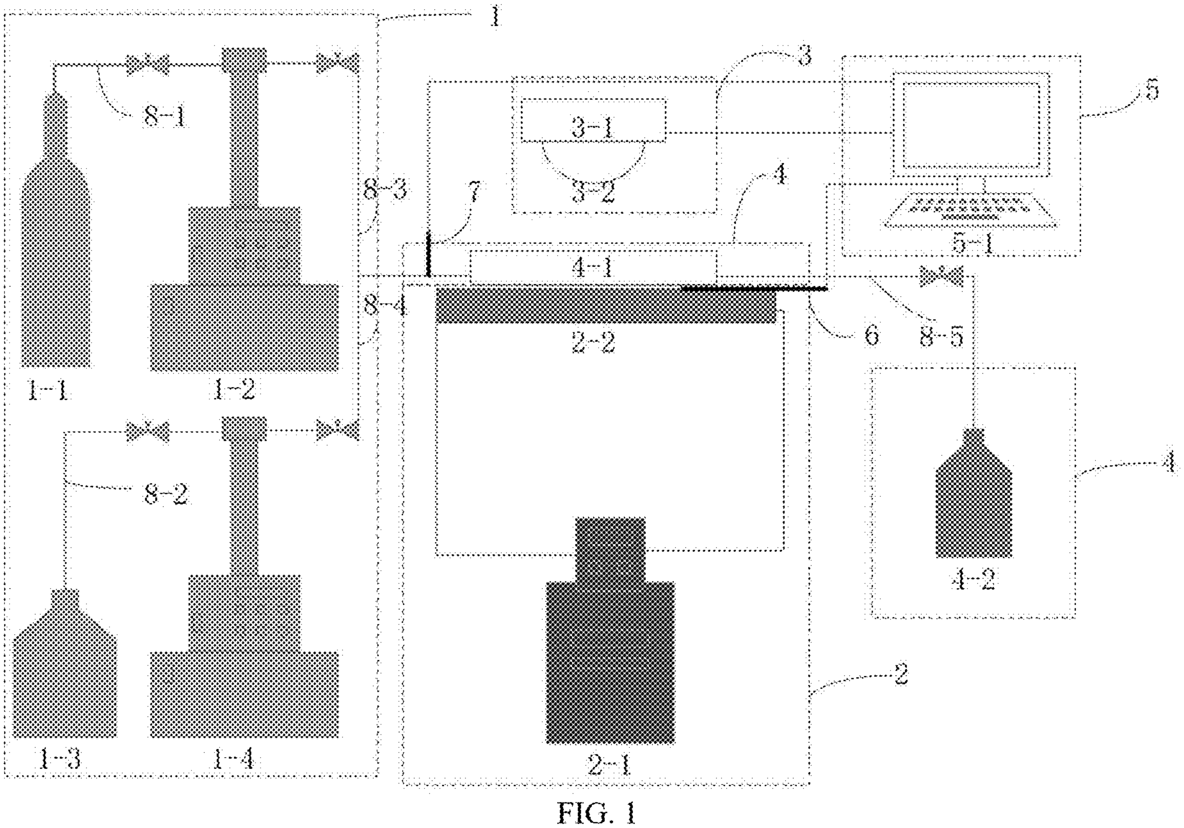
FIG. 1 illustrates a schematic diagram of a temperature testing system for hydrate nucleation and phase transition based on infrared imaging according to an embodiment of the disclosure.

As shown in FIG. 1, a temperature testing system for hydrate nucleation and phase transition based on infrared imaging is provided and includes a gas-liquid supplying device 1, a refrigeration device 2, an infrared imaging device 3, a hydrate generation device 4, and a data acquisition device 5. The gas-liquid supplying device 1 is configured to provide a gas and a liquid required for synthetizing a hydrate. The refrigeration device 2 is configured to provide a temperature environment to the hydrate generation device required for synthetizing the hydrate. The infrared imaging device 3 is configured to in-situ measure temperature changes of the hydrate generation device 4 caused of the hydrate generation device during a formation of the hydrate. The hydrate generation device 4 is configured to provide a visual growth environment for nucleation and phase transition of the hydrate. The data acquisition device 5 is configured to collect a temperature, a system pressure, and infrared imaging data from the hydrate generation device 4.

The gas-liquid supplying device 1 includes a gas cylinder 1-1, a high-pressure pump 1-2, a water container 1-3, and a water injection pump 1-4. The gas cylinder 1-1 and the high-pressure pump 1-2 are configured to provide the gas with a higher pressure in a range of 0-40 MegaPascal (Mpa) for the hydrate generation device 4, and the water container 1-3 and the water injection pump 1-4 are configured to provide the liquid for the hydrate generation device 4.

The refrigeration device 2 is connected to the gas-liquid supplying device 1 through a pressure resistant metal pipeline 8, and the refrigeration device includes a water bath device 2-1 and a refrigeration platform 2-2. The refrigeration device 2 is configured to control the temperature required for the formation of the hydrate through providing a cold fluid through the water bath device 2-1 or providing the temperature environment for the hydrate generation device 4 through the refrigeration platform 2-2 in in a semiconductor refrigeration manner.

The infrared imaging device 3 includes an infrared imager 3-1 and an infrared imaging mounting bracket 3-2, the infrared imager 3-1 is configured to measure temperature changes of the hydrate generation device 4 during the formation of the hydrate, and the infrared imaging mounting bracket 3-2 is configured to fix the infrared imager 3-1.

A material of the hydrate generation device 4 is sapphire, the hydrate generation device 4 includes a hydrate generation chamber 4-1 and a waste liquid container 4-2, and the waste liquid container 4-2 is configured to accommodate a waste liquid.

The data acquisition device 5 includes a temperature sensor 6, a pressure sensor 7, and a computer data acquisition system 5-1. The temperature sensor 6 is configured to collect the temperature in the hydrate generation device 4, the pressure sensor 7 is configured to collect the system pressure in the hydrate generation device 4, and the computer data acquisition system 5-1 is configured to receive the infrared imaging data (i.e., the temperature changes the hydrate generation device 4) from the infrared imaging device 3 and perform data analysis on the infrared imaging data.

The temperature testing system for hydrate nucleation and phase transition based on infrared imaging in this embodiment enables related research under different working mediums through the fully visible hydrate generation device of the infrared thermal imaging system. In addition, a separate liquid and gas injection pump has been designed to meet the experimental requirements of different gas components and different solution components when considering the variability of gas-liquid components in different hydrate generations.

Based on the embodiment of the disclosure, the temperature testing system for hydrate nucleation and phase transition based on infrared imaging is provided, and a temperature testing method for hydrate nucleation and phase transition based on infrared imaging is also provided. The principle is to quantitatively evaluate the potential factors affecting the temperature changes of hydrate phase transition.

(1) The hydrate nucleation and phase transition involve the breaking and the formation of hydrogen bonds, which in turn causes changes in the surrounding temperature. The extent of temperature increase during the formation of the hydrate represents the amount of hydrate formed instantaneously during the hydrate nucleation. The amount of heat absorbed during the decomposition of the hydrate represents the amount of the hydrate decomposed instantaneously. If a large amount of the decomposition occurs and the system is lowered to below zero degrees Celsius, it can lead to ice formation or secondary hydrate generation that blocks the pipeline. Therefore, the study of the characteristics of temperature evolution of the hydrate phase transition is conducted.

(2) The heat changes caused by the formation and the decomposition of the hydrate are usually measured by instruments such as thermometers or differential scanning calorimeters. However, these two types of methods measure the temperature and heat changes of the entire system of the hydrate nucleation and the phase transition and do not have the capability to determine the quantitative temperature changes of the surrounding environment caused by the hydrate nucleation and the phase transition. The method of infrared thermal imaging can accurately depict the temperature changes of the surrounding environment caused by the hydrate nucleation and the phase transition. This method can accurately quantify the thermal effects of the hydrate nucleation and the phase transition in different hydrate systems and provide data support for precisely depicting the temperature changes of the surrounding environment caused by the hydrate nucleation and the phase transition.

Figure 2:
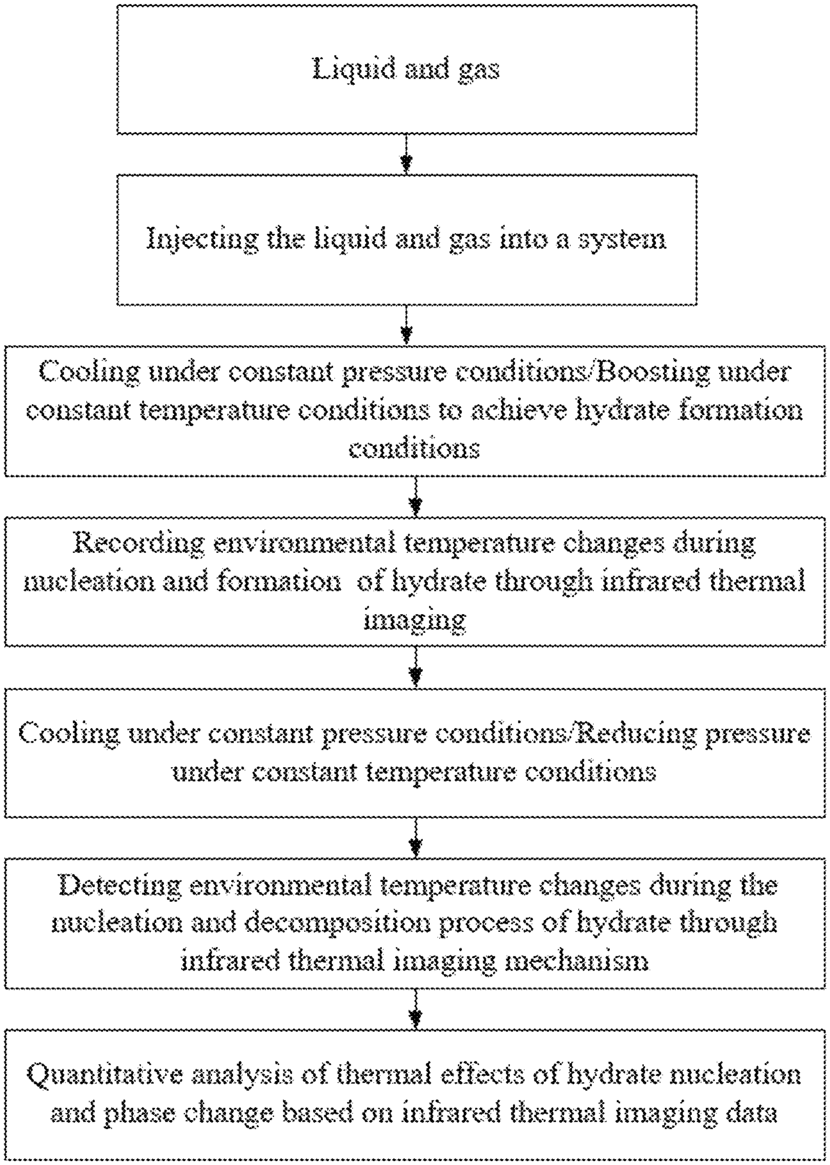
FIG. 2 illustrates a schematic diagram of a temperature testing method for hydrate nucleation and phase transition based on infrared imaging according to an embodiment of the disclosure.

As shown in FIG. 2, the temperature testing method for hydrate nucleation and phase transition based on infrared imaging includes steps as follows.

Step 1, experimental conditions are prepared as follows:

1.1, a liquid is added into a hydrate generation chamber through a water injection pump;

1.2, a gas cylinder is opened to inject a gas into the hydrate generation chamber through a high-pressure pump;

1.3, a refrigeration cycle is performed and a temperature inside the hydrate generation chamber is controlled through an external cooling.

Step 2, infrared thermal imaging experiments are conducted to determine thermal effects of nucleation and phase transition of a hydrate as follows:

step 2.1, according to the experimental conditions, a corresponding pressure is set through the high-pressure pump and a constant pressure inside the hydrate generation chamber is set through a constant pressure mode;

step 2.2, according to the experimental conditions, a cooling rate and a constant temperature of the refrigeration cycle of a water bath are set;

step 2.3, while performing step 2.2, an infrared imaging device is turned on to record temperature changes of the hydrate generation device during the formation of the hydrate;

step 2.4, surrounding temperature changes of the hydrate generation device caused by a heat release during the hydrate nucleation are recorded, and then system temperature changes during the formation of the hydrates are also recorded;

step 2.5, after the formation process of the hydrate is completed, setting a temperature gradient and the constant temperature of the refrigeration cycle of the water bath;

step 2.6, the temperature changes in a surrounding environment of the hydrate generation device caused by the decomposition and heat absorption process of the hydrate using the infrared imaging device are recorded.

In the experimental preparation of the step 1, the injected gas can be a single gas or a mixed gas to explore the effects of different guest molecules on the temperature distribution characteristics during the formation and the decomposition of the hydrate. The injected liquid can be a salt solution or an organic solution to explore the effects of different solution systems on the temperature distribution characteristics during the formation and the decomposition of the hydrate.

The above is only a specific implementation of the disclosure, but the scope of protection of the disclosure is not limited to this. Any those skilled in the art who is familiar with the technical field within the scope of the disclosed technology and makes equivalent substitutions or changes according to the technical solution and invention concept of the disclosure, should be covered within the scope of protection of the disclosure.

What is claimed is:

1. A temperature testing system for hydrate nucleation and phase transition based on infrared imaging, comprising:

a gas-liquid supplying device, a refrigeration device, an infrared imaging device, a hydrate generation device, and a data acquisition device;

wherein the gas-liquid supplying device is configured to provide a gas and a liquid required for synthetizing a hydrate;

wherein the refrigeration device is configured to provide a temperature environment to the hydrate generation device required for synthetizing the hydrate;

wherein the infrared imaging device is configured to in-situ measure temperature changes of the hydrate generation device caused during a formation of the hydrate;

wherein the hydrate generation device is made of sapphire, and is configured to provide a visually observable growth environment for nucleation and phase transition of the hydrate; and wherein the data acquisition device is configured to collect a temperature, a system pressure, and infrared imaging data from the hydrate generation device.

2. The temperature testing system as claimed in claim 1, wherein the gas-liquid supplying device comprises a gas cylinder, a high-pressure pump, a water container, and a water injection pump, the gas cylinder and the high-pressure pump are configured to provide the gas with a higher pressure for the hydrate generation device, and the water container and the water injection pump are configured to provide the liquid for the hydrate generation device.

3. The temperature testing system as claimed in claim 1, wherein the refrigeration device is connected to the hydrate generation device through a pressure resistant metal pipeline, and the refrigeration device comprises a water bath device and a refrigeration platform; the refrigeration device is configured to control the temperature required for the formation of the hydrate through providing a cold fluid through the water bath device or providing the temperature environment for the hydrate generation device through the refrigeration platform in a semiconductor refrigeration manner.

4. The temperature testing system as claimed in claim 1, wherein the infrared imaging device comprises an infrared imager and an infrared imaging mounting bracket, the infrared imager is configured to measure temperature changes of the hydrate generation device during the formation of the hydrate, and the infrared imaging mounting bracket is configured to fix the infrared imager.

5. The temperature testing system as claimed in claim 1, wherein the hydrate generation device comprises a hydrate generation chamber and a waste liquid container, and the waste liquid container is configured to accommodate a waste liquid.

6. The temperature testing system as claimed in claim 1, wherein the data acquisition device comprises a temperature sensor, a pressure sensor, and a computer data acquisition system; the temperature sensor is configured to collect the temperature in the hydrate generation device, the pressure sensor is configured to collect the system pressure in the hydrate generation device, and the computer data acquisition system is configured to receive the infrared imaging data from the infrared imaging device and perform data analysis on the infrared imaging data.

7. A temperature testing method for hydrate nucleation and phase transition based on infrared imaging, comprising:

step 1, preparing for experimental conditions, comprising:

step 1.1, adding a liquid into a hydrate generation chamber through a water injection pump;

step 1.2, opening a gas cylinder to inject a gas into the hydrate generation chamber through a high-pressure pump;

step 1.3, performing a refrigeration cycle and controlling a temperature inside the hydrate generation chamber through an external cooling;

step 2, conducting infrared thermal imaging experiments to determine thermal effects of nucleation and phase transition of a hydrate:

step 2.1, according to the experimental conditions, setting a corresponding pressure through the high-pressure pump and setting a constant pressure inside the hydrate generation chamber through a constant pressure mode;

step 2.2, according to the experimental conditions, setting a cooling rate and a constant temperature of the refrigeration cycle of a water bath device;

step 2.3, while performing step 2.2, turning on an infrared imager to record temperature changes of the hydrate generation chamber during the formation of the hydrate;

step 2.4, recording surrounding temperature changes of the hydrate generation device caused by a heat release during a nucleation process of the hydrate, and then recording system temperature changes during a formation process of the hydrate;

step 2.5, after the formation process of the hydrate is completed, setting a temperature gradient and the constant temperature of the refrigeration cycle of the water bath device; and step 2.6, recording temperature changes in a surrounding environment of the hydrate generation device caused by the decomposition and heat absorption process of the hydrate using the infrared imager.

8. The temperature testing method as claimed in claim 7, wherein in the step 1, the injected gas is a single gas or a mixed gas; the added liquid is a salt solution or an organic solution.

* * * * *